C. H. HALL.
Devices for Securing the Nozzles or Necks of Oilers, &c.
No. 151,775.  Patented June 9, 1874.
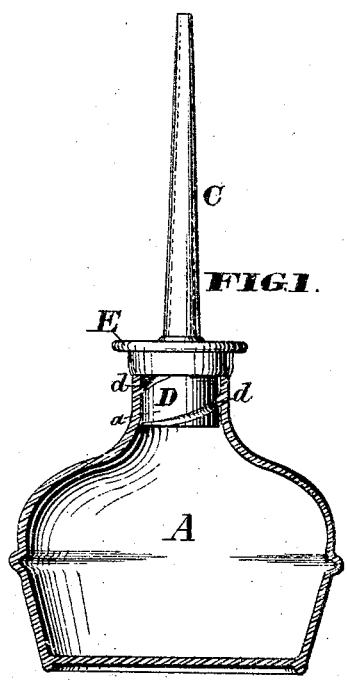
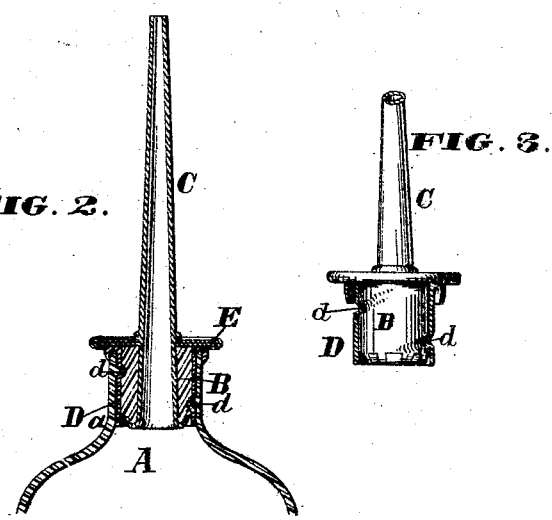
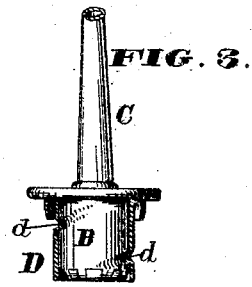
WITNESSES.  INVENTOR.

UNITED STATES PATENT OFFICE.

CHARLES H. HALL, OF BROOKLYN, NEW YORK, ASSIGNOR TO HIMSELF AND ROBERT S. MANNING, OF TRENTON, NEW JERSEY.

IMPROVEMENT IN DEVICES FOR SECURING THE NOZZLES OR NECKS OF OILERS, &c.

Specification forming part of Letters Patent No. 151,775, dated June 9, 1874; application filed November 1, 1873.

*To all whom it may concern:*

Be it known that I, CHARLES HENRY HALL, of Brooklyn, in the county of Kings and State of New York, have invented a new and useful Device for Securing the Nozzles or Necks of Oilers and other Articles, of which the following is a specification:

My invention consists in forming a secure and air-tight attachment between the body and nozzle of an oiler by means of a bushing of soft rubber surrounding the base of the detachable nozzle, and engaging with a metallic bushing inserted within the neck, and formed with a spiral bead, affording a secure hold on the outside to the rubber neck, and on the inside to the rubber bushing of the nozzle, thus constituting a secure fastening for the nozzle, but permitting its ready detachment by turning it out.

In the accompanying drawing, Figure 1 is an elevation of an oiler, the rubber body being shown in section to exhibit the construction of the neck, and the metallic bushing being shown in elevation. Fig. 2 is a vertical section of the upper portion of the same. Fig. 3 is an elevation of the nozzle with the metallic bushing of the neck shown in section and the rubber body omitted.

In the illustration given in Figs. 1 and 2, A represents the body of an oiler, made of soft rubber, tempered so as to give it the necessary resilience, and cured at a high temperature to adapt it to resist oil. B is a bushing, of soft rubber, applied to the base of a metallic nozzle, C, and adapted to fit within the sheet-metal neck D, the spiral bead *d* in which is embedded in the rubber in the act of inserting the nozzle within the neck, so as to form a screw-thread. The formation of the bead on the internal surface of the metallic neck D produces on the outside a groove, which adapts the neck *a* of the rubber body A to cling securely thereto. E represents a flange or collar, which limits the entrance of the nozzle or stopper, and may be milled on its periphery to facilitate withdrawing and inserting it.

Many advantages will accrue from the use of rubber as a material for the body of the oiler. It may, if desired, be coated on the inside with cement; but, as already stated, the rubber itself can be so cured as to make it impervious to oil. The article may be made of either white or black rubber. The resilience of the material adapts the vessel to be filled by atmospheric exhaustion on the same principle as a syringe, thus avoiding the necessity of taking out the nozzle. It is more durable than a metal can, and is not liable to be dented or injured by a slight blow. Rubber being a poor conductor of heat, the oil does not as readily congeal in it in cold weather.

The invention is equally adapted for self-oilers, as my device constitutes an excellent mode of forming the required air-tight joint in the neck.

The following is claimed as new:

The oiler consisting of the body made of resilient rubber, in combination with a metallic spirally-threaded neck, and a bushing of soft rubber surrounding the tubular stopper, as and for the purpose set forth.

In testimony of which invention I hereunto set my hand this 14th day of October, 1873.

C. H. HALL.

Witnesses:
 OCTAVIUS KNIGHT,
 ROBT. S. MANNING.